July 7, 1953 W. B. CRAWFORD 2,644,198
PROCESS OF MAKING CONTAINERS
Filed April 26, 1950 3 Sheets-Sheet 1
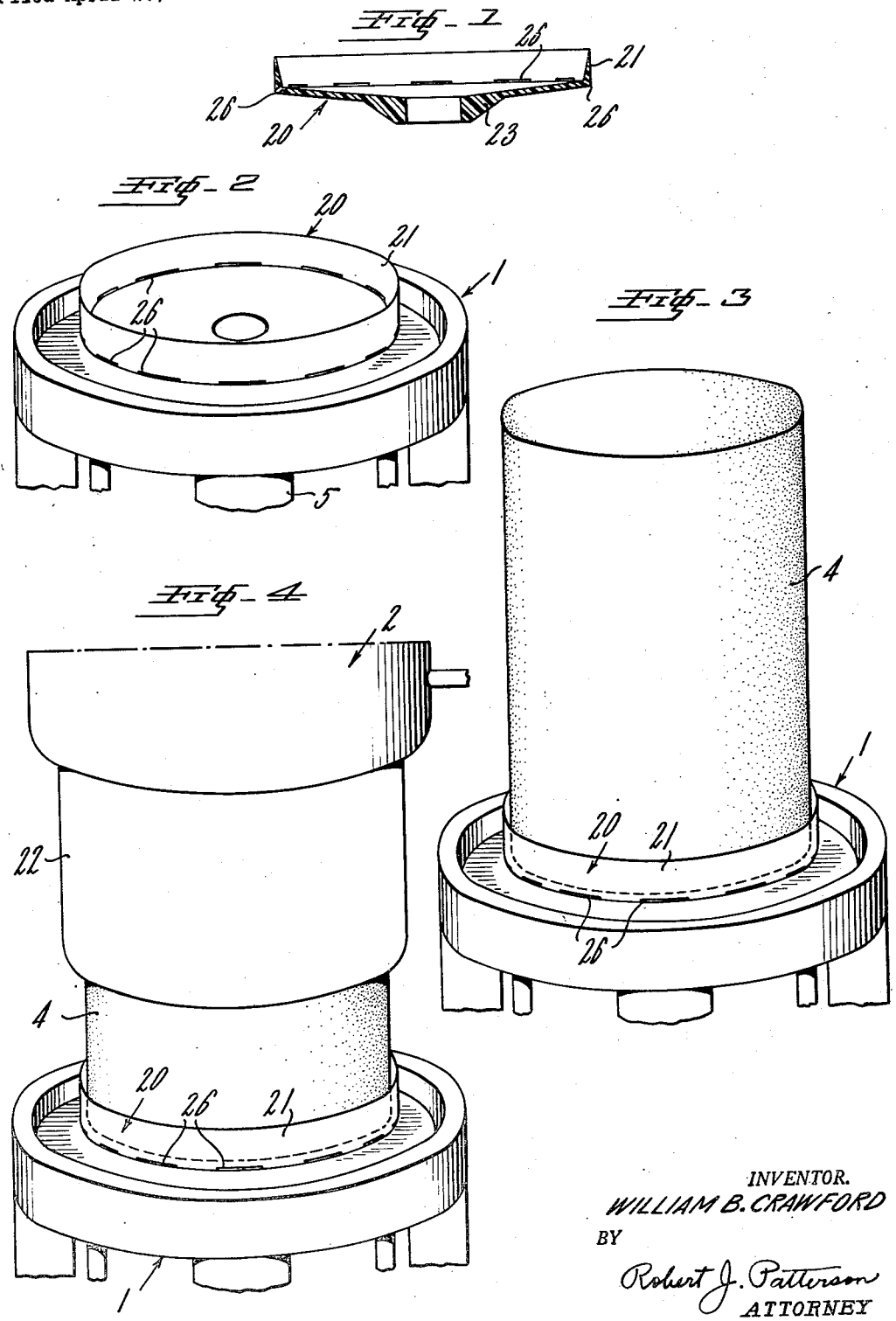
INVENTOR.
WILLIAM B. CRAWFORD
BY
Robert J. Patterson
ATTORNEY

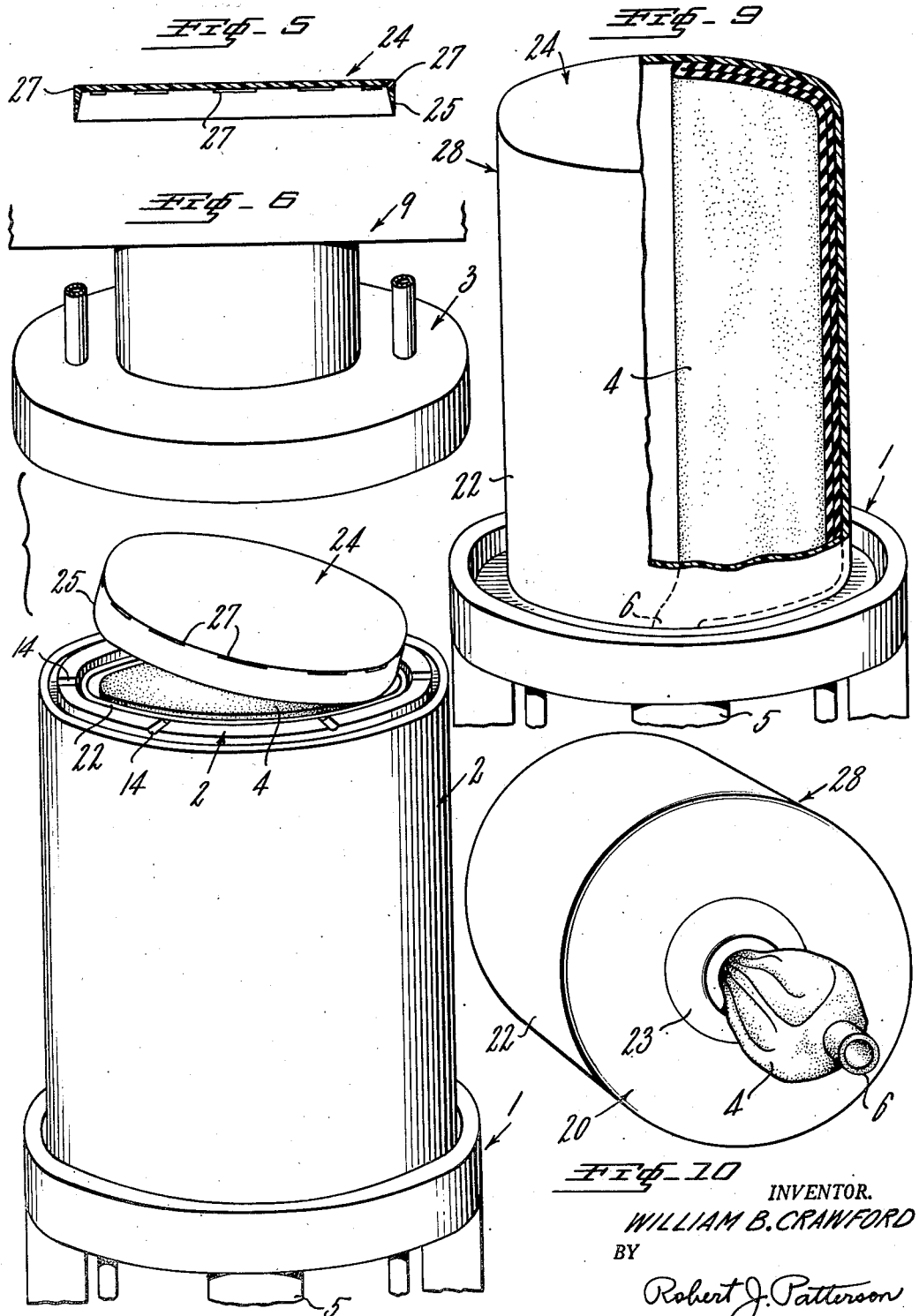

July 7, 1953 W. B. CRAWFORD 2,644,198
PROCESS OF MAKING CONTAINERS
Filed April 26, 1950 3 Sheets-Sheet 3
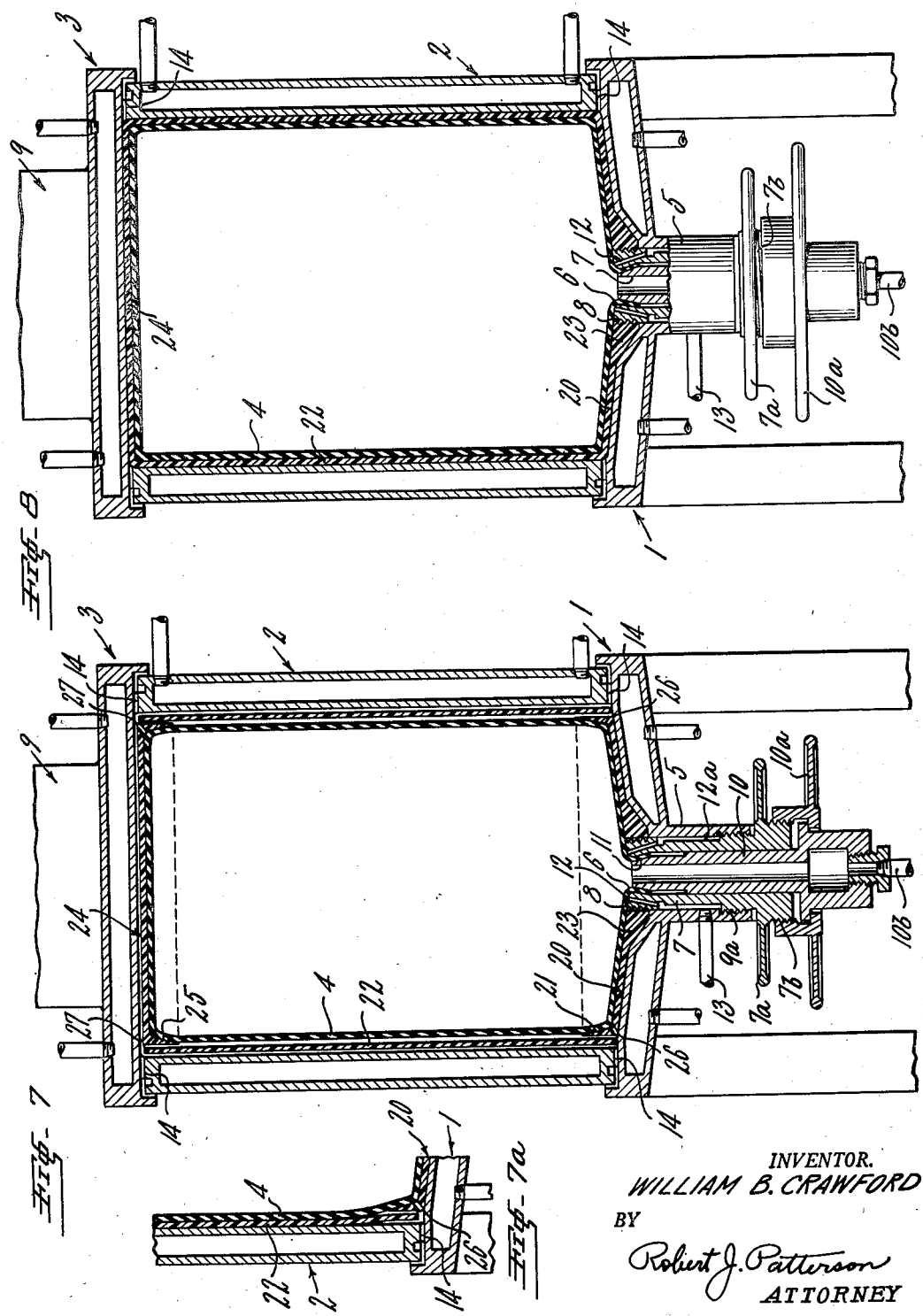
INVENTOR.
WILLIAM B. CRAWFORD
BY
Robert J. Patterson
ATTORNEY Patented July 7, 1953

2,644,198

UNITED STATES PATENT OFFICE 2,644,198

PROCESS OF MAKING CONTAINERS

William B. Crawford, South Bend, Ind., assignor to United States Rubber Company, New York, N. Y., a corporation of New Jersey Application April 26, 1950, Serial No. 158,235

3 Claims. (Cl. 18—59)

This invention relates to a process of making seamless or integral (i. e., one-piece) polyethylene containers, especially such containers which are self-supporting, from a plurality of pieces of sheet polyethylene. More particularly, the invention relates to a novel process of forming a plurality of pieces of sheet polyethylene of substantial thickness, by which is meant a thickness of at least 0.01 inch, and more commonly at least 0.05 inch, into seamless or integral self-supporting containers which display a combination of properties including strength, flexibility, toughness, unbreakability, and chemical inertness not obtainable with other materials. The process of the present invention is further characterized by being adaptable to the production of such containers of any desired size, there being no limit as to size.

It has been proposed heretofore (Modern Plastics Encyclopedia, 1948, page 936 et seq.) to make small polyethylene bottles by forming an injection molded or extruded "parison" of warm polyethylene and then blowing this with air, in a manner resembling the blowing of glass bottles, outwardly against a mold cavity. However, this process cannot be used to make containers of a capacity much over one pint because in the blowing operation it is difficult to obtain a uniform wall thickness, especially at extremities of the mold cavity.

It has also been proposed, in the copending applications of Romeyn et al., Serial No. 2,325 filed January 14, 1948, (now patent No. 2,520,737, issued August 29, 1950) and Miner et al. Serial No. 122,212 filed October 19, 1949, to join sheet polyethylene by overlapping the edges to be joined and applying heat and pressure to the overlap. In the Romeyn et al. process the heat and pressure are very carefully controlled so as to produce a good joint without having the polyethylene flow away from the site of the joint, while Miner et al. disclose the provision of cooling platens on each side of the heated joint area to obviate the necessity for such careful control of heat and pressure. However, in each case, the making of only one seam at a time is contemplated, which results in an unduly slow process and in excessive cost of fabrication.

The present invention provides a simple and economical method for making seamless or integral polyethylene bottles or the like, which imposes no limitations as to size of container produced. The present invention is characterized by the fact that it obviates all the difficulties and disadvantages of those processes of joining sheet polyethylene by flowing the overlapping edges of two pieces thereof together along a lap seam wherein one seam is made at a time.

In the accompanying drawings which portray sequential steps in a typical embodiment of the present invention:

Fig. 1 is a vertical sectional view of a flanged top-forming piece of polyethylene.

Fig. 2 shows the flanged top-forming piece of Fig. 1 in place on the top-forming section of the mold.

Fig. 3 is a similar view showing the inflatable diaphragm or bladder in position for a forming operation. The diaphragm is inflated just enough to hold its shape.

Fig. 4 is a similar view, showing the hollow cylindrical piece of polyethylene which is to form the side wall or body of the container being positioned around the diaphragm. In this view, the side-wall forming section of the mold is shown raised well above its final position, in order to illustrate the relative position of the associated parts.

Fig. 5 shows the flanged bottom-forming piece of polyethylene in vertical section.

Fig. 6 shows the flanged bottom-forming piece of Fig. 5 being placed in position. In this view the side wall-forming section of the mold has been lowered into position on the top-forming section of the mold.

Fig. 7 is a vertical sectional view with the mold closed in readiness for a seaming operation.

Fig. 7a shows a modification wherein the sidewall forming section of the container is held above the top-forming section of the mold by the outward expansion of the diaphragm.

Fig. 8 is similar to Fig. 7 but shows the three parts of the container fused together to form a seamless integral structure. In Fig. 8 the diaphragm-clamping means and associated connections are shown mainly in elevation.

Fig. 9 shows the mold open and the diaphragm collapsed inside the formed container to facilitate subsequent removal of the diaphragm. The formed container is still in screw-threaded engagement with the screw-threaded central portion of the lower mold section.

Fig. 10 shows the step of removing the diaphragm from the formed container.

The process of the present invention comprises lining a mold cavity, the inner configuration of which corresponds to the desired outer configuration of the container to be made, and which is formed by a plurality of sections, with a plurality of overlapping pieces of polyethylene so shaped and arranged that upon welding them together at their overlapping areas a seamless polyethylene container will be formed, positioning an inflatable flexible diaphragm inside the mold cavity inwardly of the pieces in such position that when it is inflated it will exert uniform positive pressure over the entire inside area of the overlapping pieces and the integral container structure formed therefrom, inflating the diaphragm to cause it to exert said pressure on the overlapping pieces, while the diaphragm is exerting said pressure applying heat to the polyethylene and thereby raising its temperature above its softening point, causing the pressure exerted by the diaphragm to effect coalescence of the polyethylene at the overlapping areas into integral, homogeneous joints and formation of a seamless structure, and, after such coalescence has been effected and while continuing to maintain uniform positive pressure from the diaphragm on the container, allowing the polyethylene to cool to a temperature substantially below its melting point to a point at which it will retain its shape. Thereafter, the mold cavity is opened, the resulting container is removed therefrom and the diaphragm is removed through a relatively small opening in a wall of the container. It will be obvious that it is necessary to so design and construct the diaphragm that it can be collapsed and withdrawn through the small opening in the container.

By proceeding in the manner just outlined it is easily possible to make a seamless polyethylene container having only a single relatively small opening, in a wall thereof, usually in the top. While the size of the opening relative to the size of the container may vary widely, by means of my invention I can easily make a cylindrical container having in its top a single opening which has a diameter less than 25% of the inside diameter of the container.

It will be understood that while I have described lining the mold cavity with the pieces of polyethylene and positioning the diaphragm within the pieces, these steps are not usually carried out in this exact sequence. In practice it is necessary to insert the diaphragm during the step of lining the mold with the sheets, and the appended claims are to be construed as covering such practice.

In making cylindrical polyethylene containers by the invention, I prefer to employ preformed integral flanged top- and bottom-forming pieces of polyethylene and a preformed seamless hollow cylindrical body-forming piece, these three pieces being positioned in the mold cavity around the diaphragm with the edges of the pieces overlapping by a sufficient distance to form, upon fusion, a good joint or seam. Preferably the distance of overlap is at least ⅛ inch.

The top- and bottom-forming pieces are conveniently preformed by injection molding of a suitable polyethylene molding powder. It is preferred that the flanges be tapered on their inside portions (as shown in Figs. 1 and 5 of the drawings) so that it is almost impossible to locate the joint after the container has been molded by my invention. I have found that by employing such tapered flanges rather than flanges of constant thickness, the parts of the container flow together with great ease.

The preformed tubular body-forming piece can conveniently be made by extruding polyethylene molding powder to form an integral seamless tube of diameter equal to or just slightly smaller than the diameter of the container to be formed and cutting off a suitable length of such tubing.

Where it is desired to form a screw-threaded centrally located opening in the top of the container, I prefer to employ a top-forming member which comprises, preferably as an integral part thereof, a heavy central section to form the screw-threaded opening and to provide a correspondingly externally screw-threaded central portion on the top-forming section of the mold. Thus, during the seaming operation the polyethylene is caused to flow into screw-threaded form under the influence of the pressure and heat applied simultaneously with welding at the joints. In this way a screw-threaded opening having a strong surrounding portion is easily formed in the top of the container. It will be understood that when such a screw-threaded opening is formed in this manner, it is necessary at the end of the operation to unscrew the formed container from the screw-threaded central projection on the top-forming part of the mold, in order to disengage the finished container.

Instead of using a seamless tubular preform to form the body of the container, I may although less preferably, employ a flat sheet of polyethylene rolled into a hollow cylindrical form with overlapping edges. This gives a container which is seamed vertically on one side, although the joint is perfectly welded and therefore integral, so that it resists separation as well or better than the rest of the container.

A minimum of three pieces, namely flanged top- and bottom-forming pieces and a body-forming piece, are required to form a cylindrical container by my invention. It will be obvious however that one or more of these three pieces can be replaced by a plurality of appropriately shaped and located pieces. For example, I may use a flanged preformed top of substantially uniform thickness and employ in conjunction therewith a separate heavy ring of polyethylene to form the central screw-threaded opening. Such a ring can be disposed in the mold in overlapping relationship with the preformed top and caused to weld into integral seamless relationship therewith during the seaming operation.

It will be understood that the flanged preforms used to form the top and bottom of the container can be quite rough (i. e., approximate in dimension), since the forming process of the invention shapes them perfectly.

Instead of using injection-molded flanged preforms for the top and bottom of the container, I can employ preforms made by clamping and positioning a sheet of heat-softened polyethylene over a female mold cavity and using a vacuum to pull the sheet down into the cavity. In large scale production, however, the use of injection molding is preferable because of cost and additionally because the heavy ring-like neck-forming part of the top-forming member can easily be injection molded integrally with the rest of the top-forming member whereas if the vacuum forming method mentioned is used it is necessary to employ a separate ring to form the neck of the container as described above.

In the practice of my invention, the diaphragm is provided with a neck which projects out through an opening in the mold surrounded by the neck-forming part of the mold, such as the screw-threaded projection in the top-forming section of the mold. The neck of the diaphragm serves to admit the fluid medium employed to inflate the diaphragm during a seaming operation.

Preferably the diaphragm is of such a shape that when it is inflated under conditions such that it is free to expand, i. e., when it is unconfined, it assumes an external configuration closely conforming to the internal configuration of the container to be made. Usually when it is inflated sufficiently to be self-supporting it will have such a configuration. By using a diaphragm of such a shape, I insure that the pressure exerted by the diaphragm upon the polyethylene is substantially uniform over the inside of the container. Furthermore, making the diaphragm of a shape closely corresponding to the interior of the bottle gives a more accurately shaped container with more uniform wall thickness and also prolongs the life of the diaphragm. Such a diaphragm can easily be made, in known manner, from suitable rubber stock by assembling to the desired form and curing.

The diaphragm is preferably made of thin rubber stock of high tensile strength and of suitable heat-resistance. It is usually constructed of Buna N rubber stock or other rubber stock that is not compatible with polyethylene, so that it will not stick to the polyethylene. It will be obvious that the stock must be quite thin in order to allow the diaphragm to be withdrawn through a top opening of small diameter. In other words, the size of the opening in the top of the container places a limit on the thickness of the stock of which the diaphragm is constructed.

Usually I construct the diaphragm of stock of about .020 to .040 inch in thickness, preferably .030". The wall thickness of the diaphragm is preferably as uniform as possible.

I prefer to employ an unheated fluid to inflate the diaphragm because if the inflating medium were heated to a temperature sufficiently high to bring the polyethylene above its softening or melting point in order to form the seamless container, the diaphragm would deteriorate rapidly and require replacement in an objectionably short period of time. It will be understood that the construction of the diaphragm is a relatively expensive operation and it is therefore desirable that it function for many container-forming operations. While it is not a preferred practice, however, I can use an inflating medium, such as steam or air, heated to a temperature sufficiently high to melt the polyethylene pieces. Alternatively, I can use such a heated inflating medium in conjunction with a heating medium circulating through cores in the sections of the mold. Generally speaking, however, I use an unheated inflating medium within the diaphragm and bring the polyethylene above its melting point by circulating a heated fluid inside the cores of the mold sections.

When making a container having angular corners, such as the top and bottom corners of a cylindrical container, I find it highly desirable to provide in the mold small transverse vents leading to the outside atmosphere and taking the form of transverse grooves located at appropriate intervals between the sections of the mold which come together at such corners. These vents serve to release air which would otherwise be trapped inside the corners of the mold between the polyethylene pieces and the mold sections, and, where the slits mentioned in the next paragraph are provided, also serve to allow the escape of air passing outwardly through said slits. The vents should be so small that no substantial amount of molten polyethylene can escape outwardly through them.

I have further found that it is especially advantageous when making such a cylindrical container to slit the flanged top and bottom preforms along the corners prior to positioning such preforms in the mold. The provision of a plurality of such slits, spaced at intervals around the edges of the top and bottom preforms, prevents the trapping of air in the corners of the container between the diaphragm and the polyethylene pieces, allowing the air which would normally be trapped therebetween to vent outwardly into the area between the sheets and the mold sections and thence by way of the vent grooves mentioned in the preceding paragraph to the outside atmosphere. These slits are subsequently completely sealed by fusion and flowing of the polyethylene during the seaming operation.

The pressure exerted upon the polyethylene pieces and the melted polyethylene by the diaphragm may vary within wide limits but should be sufficiently great to produce perfectly smooth seams at the joints and to keep the molten polyethylene from flowing, sagging or thinning under the influence of gravity. Generally the pressure in the diaphragm is maintained at a value ranging from 40 to 120 pounds per square inch gauge during the formation of the container, i. e., during the melting and coalescence at the joints to form the desired integral seams.

The temperature to which the polyethylene is brought during the seaming step may likewise vary widely. To be safe the polyethylene should be brought to a temperature at least 5° F. above its melting point. Temperatures much higher than this are preferred, however, in the interest of rapid production. Generally speaking, I employ a temperature ranging from 50° to 120° F. above the melting point of the polyethylene, such temperature insuring that the polyethylene is completely molten and so highly mobile as to flow freely and rapidly together. The temperature used should be below the decomposition temperature of the polyethylene. In this connection, it may be noted that where I refer herein to the softening point or the melting point of polyethylene, I mean its melting point as determined by the disappearance of the X-ray diffraction pattern indicating disappearance of the crystalline phase. The melting point of commercially available polyethylene preferred for containers is 220° F.

In prior practice, extraneous materials like polyisobutylene have generally been present in admixture with the polyethylene primarily for the purpose of broadening the softening range of the polyethylene so that it can be seamed and fabricated much more easily. However, materials like polyisobutylene do not have the same chemical and physical properties as pure polyethylene and therefore their presence is undesirable. The present invention enables the welding of pieces consisting of 100% pure polyethylene into seamless integral containers without the presence of any other material, and is in distinct contrast to prior attempts to weld polyethylene containing considerable amounts of added material like polyisobutylene or torch-welding of polyethylene using a welding rod of polyethylene plasticized with polyisobutylene. Such torch-welding methods have not proven successful because they require a special skill difficult to develop. Only joints consisting of pure polyethylene display the properties of polyethylene, particularly its inertness to corrosive liquids and its extreme insolubility in liquids normally considered to have high solvent power for resins. Therefore, in practicing my invention I much prefer to employ pieces consisting essentially of polyethylene containing no added ingredients which would change its essential nature from that of pure polyethylene. Nevertheless, I am not so limited but can use pieces comprising polyethylene and other compatible materials.

The practice of my invention involves, in addition to exerting pressure on two pieces of polyethylene in overlapped relationship, while heat is applied, a substantial amount of slippage of the overlapping surfaces. This slippage occurs as a result of the slight expansion of the diaphragm which takes place during the seaming step. As the parts of the container are heated up to the melting point they move slightly relative to one another under the pressure exerted by the diaphragm and the resulting slippage of the contacting surfaces at the seams between the end flanges and the body section overcomes the surface tension of the molten polyethylene and gives a much better bond.

After the containers have been seamed in accordance with the invention and subsequently cooled well below the melting point of the polyethylene, i. e., to a point at which they retain their structure upon deformation, the diaphragm is deflated in any suitable manner as by release of pressure. At this point in the process, I have found it highly desirable to partially collapse the diaphragm to separate it from a side wall of the formed container and thus greatly facilitate the subsequent removal of the diaphragm from within the container. I have found that a most effective way of bringing about this partial collapse of the container involves the provision of small passageways in the neck-forming portion of the mold mentioned above and the introduction of air under pressure through such passageways into the space between the container and the diaphragm. This air passes between the container and the diaphragm on one side thereof pushing the diaphragm away from the container and collapsing approximately one-half of the diaphragm away from the side of the container, forcing the stripped portion of the diaphragm into an unstripped half thereof.

Vacuum may then be applied through these same passageways to destroy or neutralize any positive air pressure between the partially collapsed diaphragm and the container and thus prevent the violent expulsion of any such air under pressure during subsequent portions of the operation.

By means of the invention, I have successfully made many one-piece cylindrical polyethylene containers from sheet polyethylene stock ranging from 0.075" to 0.100" in thickness, for example, containers having a capacity of one U. S. gallon and being approximately 6½ inches in outside diameter and 9¾ inches in height with a screw-threaded centrally-located opening approximately 1¼ inches in diameter in the top. However, it will be obvious that containers of any size and shape can be made by the invention.

Referring now to the accompanying drawings, in making a cylindrical polyethylene container, I prefer to employ a three-section mold composed of a top-shaping section 1, a cylindrical side wall-shaping section 2 and a bottom-shaping section 3. Each of these mold sections is cored and provided with inlet and outlet means for the admission and exit of a heating medium during the seaming and a cooling medium thereafter. Mold section 1 is rigidly supported in any suitable manner after which section 2 is placed in position thereover followed by section 3. Mold closing pressure at least equal to, and preferably considerably greater than, the pressure exerted by the forming diaphragm 4, which is within the container to be formed, is then applied downwardly upon the top of section 3 in any suitable manner as by a hydraulic ram 9.

Referring now particularly to Fig. 7, mold section 1 is provided centrally with an integral hollow cylindrical portion 5 which is provided with means adapted to receive the neck 6 of the diaphragm 4 and with means to form the opening or neck in the center of the top of the container. Within portion 5 there is provided an annular sleeve 7 which is vertically movably disposed and which screw threadedly engages the lower internally threaded end of sleeve 5 at 9a, integral hand wheel 7a being provided for raising or lowering sleeve 7. Sleeve 7 extends upwardly above mold section 1 and its projecting portion is provided on its outward surface with screw-threads 8 which serve to mold the screw-threads on the inside of the neck of the container during the seaming. The upper portion of sleeve 7 is drilled with a plurality of angularly spaced ports 12 which connect the inside of the mold to the annular space 12a which is formed between sleeves 5 and 7 and which can be connected to a source of compressed air or vacuum through nipple 13. This enables air under pressure to be applied between the formed container and diaphragm 4 in order to collapse diaphragm 4 partially within the formed container. Ports 12 also enable the application of a vacuum between diaphragm 4 when collapsed and the formed polyethylene container to destroy any positive air pressure between the collapsed diaphragm and the container.

Another sleeve 10 fits up inside sleeve 7, being held in place by a separate hand wheel 10a which screw-threadedly engages hand wheel 7a at 7b. The upper portion of sleeve 10 is smaller than sleeve 7 and the upper outside portion of sleeve 10 has a bevelled surface 11 which engages the neck 6 of diaphragm 4 and compresses it against the cooperating bevelled surface of sleeve 7 to clamp neck 6 and provide a fluid-tight seal between neck 6 and clamping sleeves 7 and 10, as sleeve 10 is moved upwardly by turning hand wheel 10a. When it is desired to remove the diaphragm 4, the sleeve 10 is lowered to release the neck 6.

A pipe located centrally within sleeve 10 and extending up into the diaphragm 4 can be provided, if desired, to facilitate the introduction of a heated fluid medium under pressure, such as steam, into the interior of the diaphragm for the purpose of heating the polyethylene from the inside as well as by means of the heated mold sections. Since use of a heated inflated medium shortens the life of diaphragm 4 use thereof is not preferred. A nipple 10b provides for the admission of inflating fluid to the interior of diaphragm 4.

In order to vent trapped air from between the formed container and the mold, and particularly from the corner areas, a plurality of small transverse grooves 14 are provided at the bottom and top of ring-shaped mold member 2. These grooves 14 freely communicate with the outside atmosphere. It will be understood that these transverse vents 10 are shown greatly enlarged in the drawings for purposes of illustration. In practice they are quite small in cross-section being just large enough to allow the air to escape freely but not large enough to allow molten polyethylene to flow out therethrough during the seaming operation, which would be objectionable for several reasons.

The formation of a container by the present invention will now be described with reference to the drawings.

With mold members 2 and 3 removed, a flanged top-forming preform 20 such as is shown in Fig. 1 is first laid upon mold section 1 in the position shown in Fig. 2. Preform 20 has an outwardly tapered flange 21 and a thick ring-like portion 23 which is adapted to form the internally screw threaded neck of the container.

The diaphragm 4 is then placed in the position shown in Fig. 3, neck 6 being tightly sealed between sleeves 7 and 10 by rotation of hand wheel 10a so as to move sleeve 10 upwardly. After placement and clamping, the diaphragm 4 is inflated under moderate pressure so as to cause it to support itself in the shape shown in Fig. 3.

In the next step of the operation, portrayed in Fig. 4 the extruded length 22 of polyethylene, which is to form the side walls of the container, is placed in position around diaphragm 4. This can be easily accomplished by positioning annular mold section 2 substantially above section 1 and positioning the cylinder 22 partially within section 2 and partially around the upper portion of diaphragm 4. Then mold member 2 can be lowered until it rests on mold section 1 while length 22 is also lowered in such manner as to overlap the flanged part 21 of top-forming member 20 on the outside of flange 21. The extent of the overlap should be at least ⅛" and usually is about ½".

The air between the diaphragm 4 and the polyethylene can escape outwardly beneath the lower edge of cylinder 22 and the upper face of the lower mold section 1 and thence through radial grooves 14 to the outside. However such escape of air can be facilitated by positioning cylinder 22 so that its bottom edge is slightly above the upper face of mold section 1, say ⅛" to ¼" thereabove; cylinder 22 can be supported in this position by the application of sufficient air pressure within diaphragm 4 to cause the side wall of diaphragm 4 to hold the cylinder 22 in a slightly raised position between the inner wall of mold section 2 and the outer wall of diaphragm 4 as shown in Fig. 7a. Such raising of cylinder 22 before seaming also allows the material of cap 20 to flow out over the lower edge of cylinder 22.

The next step in the operation, portrayed in Fig. 6 involves placing the flanged bottom-forming member 24 such as that shown in Fig. 5, in position on the top of diaphragm 4 with its flange 25 inwardly overlapping the upper portion of sheet 22. An overlap of at least ⅛" between body sheet 22 and flange 25 is desirable in order to form a good smooth strong joint. Again an overlap of the order of ½" is very suitable. It is preferred that the upper edge of sheet 22 be spaced slightly (say ⅛" to ¼") below the adjacent lower face of mold section 3 (as shown in Fig. 7) so as to allow free escape of trapped air from the upper corners of the assembly and to allow the material of cap 24 to flow out over the upper edge of body sheet 22.

One or both of members 20 and 24 may be slit at the corners of flanges as at 26 and 27, respectively, in the manner described above, in order to allow the escape of air from between the corners of the container being formed and the corners of diaphragm 4. These slits 26 and 27 preferably run along the edge of the container and preferably are extremely thin. They may conveniently be made by the insertion and removal of a thin knife blade. The slits may conveniently have a length of approximately 1". They are completely sealed during the seaming. The width of these slits is shown as greatly exaggerated in the drawings for purposes of illustration. Actually they are extremely thin.

The next step in the process comprises placing mold section 3 in position and clamping the three parts of the mold together tightly by downward pressure of ram 9 on mold section 3. The parts now are in the position shown in Fig. 7 and are in readiness for the seaming operation. Air pressure of the desired magnitude is now applied via nipple 10b to the interior of diaphragm 4 whereupon the application of heat by means of mold members 1, 2 and 3 is begun, this application of heat being effected by the passage of steam or other heated fluid through the hollow cores of the mold sections 1, 2 and 3. This causes fusion of the polyethylene and all of parts 20, 22 and 24 to be completely fused together to form an integral seamless structure. At the same time the inside of ring-like portion 23 is caused to be molded to the screw-threaded form of threads 8. The parts now are in the condition shown in Fig. 8.

The next step in the operation involves the discontinuance of the application of heat and the substitution of a cooling medium within the cores of mold sections 1, 2 and 3 to solidify the molten container and cool it down to a temperature at which it will retain its structure. The air pressure within diaphragm 4 is maintained during the cooling step. Then the pressure inside diaphragm 4 is released.

In order to separate diaphragm 4 from the formed container, air under pressure is now introduced through ports 12, causing approximately half of diaphragm 4 to be collapsed away from the container. After the diaphragm has been thus collapsed, application of compressed air through ports 12 is discontinued.

The mold is then opened by removing mold sections 2 and 3. Fig. 9 shows the condition of the parts at this stage of the operation. It will be noted that the diaphragm 4 is shown as collapsed within the formed container 28 which is still screw-threadedly engaged with mold section 1.

The container 28 with diaphragm 4 therein is now unscrewed from engagement with threads 8 and thus removed from mold section 1. The diaphagm 4 is then removed from the finished container 28 as shown in Fig. 10.

*Example*

Using the equipment shown in the drawings and the method described in detail above, a polyethylene container having a capacity of one U. S. gallon and the dimensions mentioned above was made from pieces of polyethylene stock having a thickness of 0.075" in the cylindrical body portion and 0.100" for the flanged top- and bottom-forming preforms, with the exception of the neck-forming portion of the top-forming piece, which was, of course, of relatively great thickness. Air under a pressure of 50 pounds per square inch gauge was applied by means of a diaphragm 4 and maintained throughout the seaming and cooling steps. Steam under pressure was introduced into the cores of mold sections 1, 2 and 3 to effect the melting of the polyethylene. The initial steam pressure in the cores was about 85 pounds gauge (corresponding to about 327° F.). The steam pressure gradually increased as the apparatus heated up, due to the cessation of condensation of steam, until the steam pressure in the cores was equal to the line pressure. After the steam had been on for 6 minutes, it was at a pressure of 105 pounds, corresponding to about 341° F. At the end of this time, it was known that the polyethylene within was entirely melted because a piece of polyethylene adhering to the exterior wall of mold section 2 had changed from an opaque material to a transparent material and had sagged considerably. The introduction of steam was then discontinued and cooling water at about 80° F. was passed through the cores of the mold sections 1, 2 and 3 for about 4 minutes. The air pressure within diaphragm 4 was then released. The air pressure at about 20 pounds pressure was introduced through passageways 12 to collapse the diaphragm 4. Vacuum was then applied through passageways 12 to neutralize any positive pressure. The mold was then opened, the container with diaphragm therein unscrewed, and the diaphragm removed therefrom. The resulting container had a perfectly smooth exterior, conforming exactly to the inside of the mold, and a smooth interior. It was almost impossible to see where the material had been seamed and the joints were as strong as the original sheet stock and were completely resistant to any attempts to separate the material at the joints.

From the foregoing it will be seen that the present invention provides a simple and economical process for making seamless polyethylene containers without the objections incident to making such containers by forming the seams one at a time. The present invention effects a great saving in time because all of the seams are made in one operation. The present invention imposes no limitation on the size of container. The resulting containers are smooth at the seams and the seams are as strong as, or stronger than, the rest of the container. The diaphragm makes it possible to obtain perfectly smooth seams both on the inside and on the outside of the container. The diaphragm also serves to make a container which exhibits no substantially thinned-out portions because the diaphragm keeps the molten material under substantially uniform pressure over its entire area and positively prevents substantially all thinning or sagging during the forming operation in any portion of the container. The present invention obviates the necessity of accurately controlling the temperature and pressure. Any temperature above the melting point of polyethylene and below its thermal decomposition point can be used in practicing the invention. There is no necessity for accurately co-relating the temperature and pressure within critical limits. Many other advantages of my invention will be apparent to those skilled in the art.

Having thus described my invention, what I claim and desire to protect by Letters Patent is:

1. The process of making an integral one-piece cylindrical polyethylene container having an opening in the top thereof which comprises forming a cylindrical side wall member consisting of polyethylene and flanged top and bottom wall members consisting of polyethylene, the top wall member having an opening therein, assembling said members in the shape of the container with an inflatable flexible diaphragm on the inside thereof, said diaphragm being shaped to the contour of the meeting side wall with the top and bottom walls of the container and having a neck extending through said opening, said flanged members being disposed at the ends of said cylindrical member with their flanged portions overlapping said ends, enclosing the assembly of said members and said diaphragm in a supporting mold cavity with said neck projecting through a wall of said cavity, inflating said diaphragm by introducing an inflating fluid through said neck and thereby causing said diaphragm to press said members outwardly against said mold cavity and to press said members together at their overlapping edge portions, heating said members to a temperature above the softening point thereof while so pressing with said diaphragm and thereby causing coalescence of the polyethylene at said overlapping edge portions into integral, homogeneous joints, and cooling the polyethylene structure so formed to a temperature substantially below its softening point and at which it will retain the resulting shape while so pressing with said diaphragm.

2. The process of claim 1 wherein the cylindrical side wall member and flange top and bottom wall members are formed of polyethylene of sufficient thickness to be self supporting throughout.

3. The process of claim 1 wherein said diaphragm is so shaped that when inflated enough to extend without stretching its walls it will assume a configuration that conforms closely to the desired inner configuration of the container being formed.

WILLIAM B. CRAWFORD.

References Cited in the file of this patent

UNITED STATES PATENTS

| Number | Name | Date |
|---|---|---|
| 178,479 | Smith et al. | June 6, 1879 |
| 1,381,179 | Gerson | June 14, 1921 |
| 1,986,629 | Fenton | Jan. 1, 1935 |
| 2,345,977 | Howald et al. | Apr. 4, 1944 |
| 2,441,699 | Gramelspacher | May 18, 1948 |
| 2,460,820 | Hagopian | Feb. 8, 1949 |

FOREIGN PATENTS

| Number | Country | Date |
|---|---|---|
| 600,065 | Great Britain | Mar. 31, 1948 |